United States Patent [19]

Iwata

[11] Patent Number: 5,087,882
[45] Date of Patent: Feb. 11, 1992

[54] IONIZATION CURRENT DETECTOR DEVICE FOR AN INTERNAL COMBUSTION ENGINE

[75] Inventor: Toshio Iwata, Himeji City, Japan

[73] Assignee: Mitsubishi Denki K.K., Tokyo, Japan

[21] Appl. No.: 522,012

[22] Filed: May 11, 1990

[30] Foreign Application Priority Data

May 15, 1989 [JP] Japan .................. 1-118757
May 15, 1989 [JP] Japan .................. 1-118758

[51] Int. Cl.⁵ .............................................. F02P 17/00
[52] U.S. Cl. .................................. 324/388; 123/425; 324/464
[58] Field of Search ............... 324/382, 384, 388, 393, 324/402, 464; 361/253; 123/425, 536; 73/116

[56] References Cited

U.S. PATENT DOCUMENTS

| | | | |
|---|---|---|---|
| 1,998,405 | 4/1935 | Fernandez | 324/388 |
| 2,339,713 | 1/1944 | McCarty | 324/384 |
| 3,572,103 | 3/1971 | Marino | 324/384 |
| 3,886,441 | 5/1975 | Kranz et al. | 324/402 |
| 3,959,725 | 5/1976 | Capek | 324/402 |
| 4,399,407 | 8/1983 | Kling et al. | 324/384 |
| 4,648,367 | 3/1987 | Gillbrand et al. | 123/425 |
| 4,862,093 | 8/1989 | Jiewertz | 324/464 |

FOREIGN PATENT DOCUMENTS

| | | | |
|---|---|---|---|
| 60551 | 4/1984 | Japan . | |
| 249051 | 10/1987 | Japan . | |
| 2125172 | 2/1984 | United Kingdom | 324/393 |

Primary Examiner—Kenneth A. Wieder
Assistant Examiner—Maura K. Regan
Attorney, Agent, or Firm—Sughrue, Mion, Zinn Macpeak & Seas

[57] ABSTRACT

An ionization current detector for detecting the combustion states of an internal combustion engine is disclosed, which comprises: a high voltage generation circuit means, including a series circuit of a resistor, a diode, a capacitor, and a Zener diode, coupled across the output terminal of the ignition coil and the ground; diodes coupled across the peripheral terminals of the distributor and a negative terminal of the capacitor; and a current detector circuit including a resistor coupled across the positive terminal of the capacitor and the ground and a voltage divider for detecting the amount of the ionization current. An additional Zener diode is coupled in parallel with the capacitor to limit the voltage across the capacitor. The whole detector is incorporated into a single unit mounted to the distributor cap.

10 Claims, 4 Drawing Sheets

IONIZATION CURRENT DETECTOR DEVICE FOR AN INTERNAL COMBUSTION ENGINE

BACKGROUNDS OF THE INVENTION

This invention relates to ionization current detector device for detecting an ionization current which flows across a gap situated within cylinders of an internal combustion engine and which is indicative of the combustion states within the cylinders.

There are various methods for detecting the combustion states in the cylinders of an internal combustion engine. One among them is the method according to which the ionization current flowing across a gap situated within cylinders of an engine is detected. The principle of operation of ionization current detector devices for detecting the combustion states of an engine is well known: During the combustion period of the cylinders of the engine, a great amount of gaseous ions is generated within the cylinders due to the chemical reactions involved in the combustion. The concentration of ions, which is indicative of the state of the combustion within the cylinders of the engine, can be detected by means of the ionization current flowing across air gaps situated within the cylinders. Thus, by disposing an air gap within a cylinder of the engine and then applying a voltage thereacross, the combustion state can be detected by means of the ionization current which flows across the gap.

FIG. 1 shows the organization of a conventional ionization current detector device for detecting the combustion state of an internal combustion engine. In the figure, reference numeral 1 represents a cylinder of the engine, and the output terminal of the secondary side of an ignition coil 2 is coupled to a terminal of a spark plug 3 at the top of the cylinder 1, wherein the other terminal of the spark plug 3 is grounded. Thus, when the current supplied to the primary side coil of the ignition coil 2 is turned off, a high voltage of negative polarity is induced at the output terminal of the secondary side of the ignition coil 2, so that a spark is struck across the gap of the spark plug 3 to ignite and combust the air-fuel mixture within the cylinder 1. On the other hand, an ionization current detector plug 4 has an air gap disposed within the cylinder 1 for detecting the ionization current which flows thereacross; one of the two terminals of the detector plug 4 is grounded, while the other terminal is coupled to the negative terminal of a DC voltage source 5, whose positive terminal is coupled to ground via a resistor 6. The voltage developed across the detector output terminals 7 coupled across the two ends of the resistor 6 is proportional to the ionization current which flows across the gap of the detector plug 4.

Thus, the detector device of FIG. 1 can detect the ionization current indicative of the combustion state as follows. When the cylinder 1 is not in the combustion state, the amount of ions in the cylinder 1 is negligible and hence the magnitude of current which flows across the gap of the detector plug 4 is also negligible. Thus, no appreciable voltage is developed across the detector output terminals 7. On the other hand, when the air-fuel mixture within the cylinder 1 is combusted and the concentration of ions within the cylinder 1 increases, the electrical resistance across the gap of the detector plug 4 is reduced. Thus, ionization current flows across the gap of the detector plug 4 and through the voltage source 5 and the resistor 6. The voltage drop across the resistor 6, which is proportional to the ionization current flowing across the gap of the detector plug 4, is detected at the terminals 7.

The above ionization current detector device, however, has the following disadvantage. Namely, if the device comprises only one ionization current detector plug 4, the device is only capable of detecting the combustion state of one cylinder; the detector is incapable of detecting the combustion states of the respective cylinders of a multicylinder engine. If the respective combustion states of the cylinders of a multicylinder engine are to be detected, a detector plug unit must be disposed in every one of the cylinder, which complicates the organization of the detector and increases the cost thereof.

FIG. 2 shows the organization of another conventional ionization current detector device for an internal combustion engine which comprises four cylinders. In the figure, the central terminal of the distributor 9 is coupled to the output terminal of the secondary side of the ignition coil 2, while the peripheral terminals of the distributor 9 are coupled to the spark plugs 3 of the respective cylinders of the internal combustion engine. The ionization current detector device is coupled across a peripheral terminal of the distributor 9 and the ground so as to detect the ionization current which flows across a gap of the spark plugs 3. Namely, there is coupled, across a peripheral terminal of the distributor 9 and the ground, a series circuit consisting of: a diode 8 whose anode is coupled to the peripheral terminal of the distributor 9; a high voltage source 5 whose negative terminal is coupled to the cathode of the diode 8; and a resistor 6 of the current detection circuit 6a, across the two terminals of which is developed a voltage proportional to the ionization current flowing across the gap of a spark plug 3.

The method of operation of the detector of FIG. 2 is similar to that of the detector of FIG. 1, except that the ionization current flows across the gap of a spark plug instead of the narrow gap of a separate detector plug. It is noted in this connection that in the case of the detector of FIG. 2, a voltage source 5 providing a high voltage is required, and that the detector circuit 6a is coupled to a high voltage lead of this high voltage source 5. Thus, in addition to the need for the provision of a high voltage source 5, the ionization current detector device of FIG. 2 has the following disadvantage. Namely, for the purpose of grounding a terminal of the detector resistor 6, which is coupled to the high voltage source 5, at a location which is removed from the distributor 9, the disposition of a long high voltage cord is required; this disposition of a long high voltage cord results in the generation of electromagnetic noises.

SUMMARY OF THE INVENTION

It is therefore a primary object of this invention to provide an ionization current detector device for detecting the combustion states of the cylinders of a multicylinder internal combustion engine, which is capable of detecting the respective combustion states of the cylinders of the engine and which eliminates the need for the provision of a large-sized high voltage source and a long high voltage cord which may become the source of electromagnetic noises.

The above object is accomplished according to the principle of this invention by an ionization current detector device which comprises: high voltage generation circuit means, coupled across the ground and an output terminal of a secondary side of the ignition coil, for generating a high voltage for an ionization current by means of a high voltage produced across the ground and an output terminal of a secondary side of the ignition coil, said high voltage generation circuit means including a capacitor for maintaining thereacross the high voltage produced across the ground and the output terminal of the secondary side of the ignition coil; ionization current detector circuit means, coupled across the grounded side terminal of the capacitor and the ground, for generating a detector output voltage proportional to an ionization current flowing therethrough; and rectifier diodes, each coupled across a peripheral terminal of the distributor and a terminal of the capacitor opposite to the grounded side terminal thereof, each diode having a forward conducting direction to allow an ionization current to flow through a series circuit comprising: a gap of the spark plug, the diode, the capacitor means, and the ionization current detector circuit means, the ionization current being produced by the voltage maintained across the capacitor.

The high voltage generation circuit means may further comprise: a first rectifier diode coupled across the ground and the grounded side terminal of the capacitor; and a second rectifier diode coupled across the terminal of the capacitor opposite to the grounded side terminal thereof, and the output terminal of the secondary side of the ignition coil; wherein said first and second rectifier diodes have a forward conducting direction to allow a charge current charging the capacitor to flow across the ground and the output terminal of the secondary side of the ignition coil. The high voltage generation circuit means may further comprise a Zener diode coupled in a parallel circuit relationship with the capacitor in a polarity opposite to a polarity of the capacitor so as to limit under a predetermined level the voltage maintained across the capacitor.

It is preferred that the whole ionization current detector device is mounted to the distributor as a single unit.

BRIEF DESCRIPTION OF THE DRAWINGS

The novel features which are believed to be characteristic of this invention are set forth with particularity in the appended claims. This invention itself, however, both as to its organization and method of operation, together with further objects and advantages thereof, may best be understood from the detailed description of the preferred embodiment, taken in connection with the accompanying drawings, in which:

In the drawings, like reference numerals represent like or corresponding parts.

DETAILED DESCRIPTION OF A PREFERRED EMBODIMENT

Figure 1:
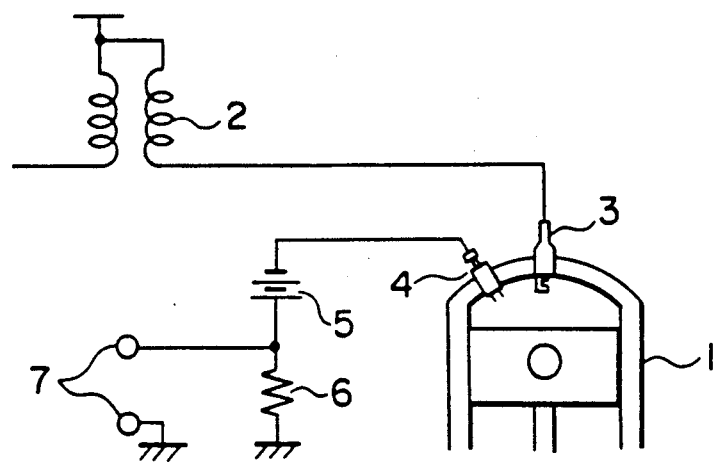
FIG. 1 is a circuit diagram showing the organization of a conventional ionization current detector device for an internal combustion engine.
Figure 2:
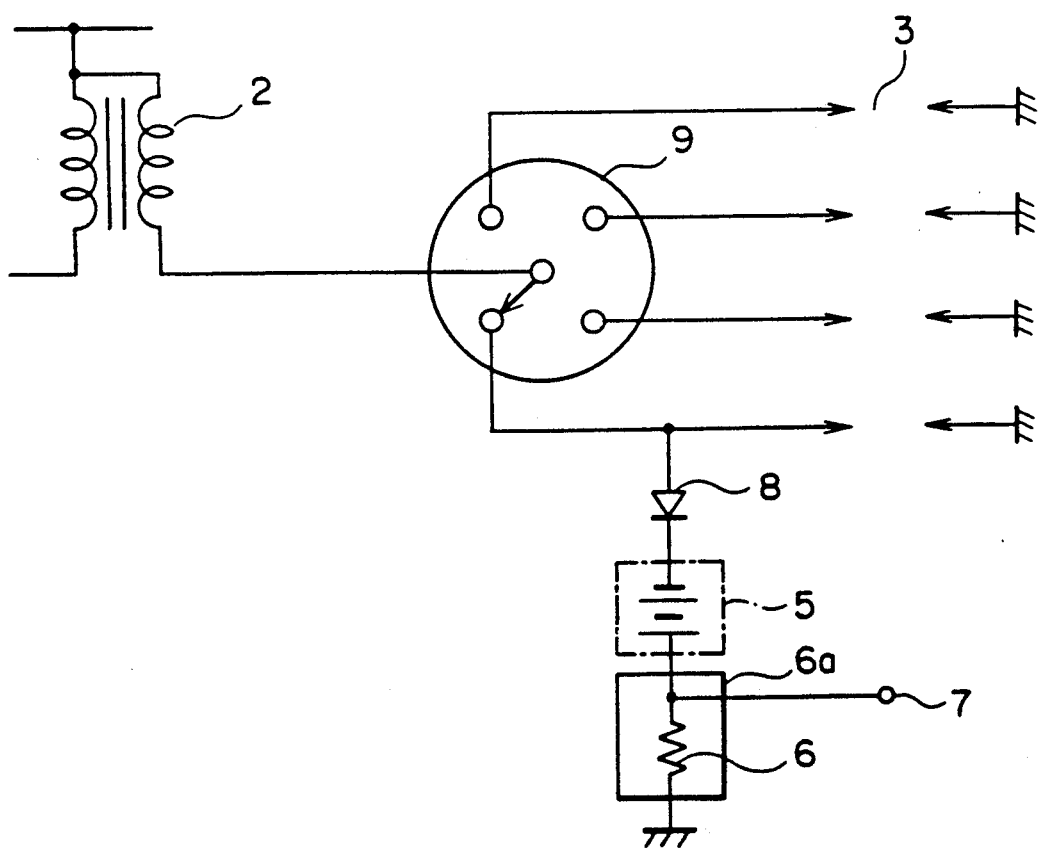
FIG. 2 is a circuit diagram showing the organization of another conventional ionization current detector for an internal combustion engine.
Figure 3:
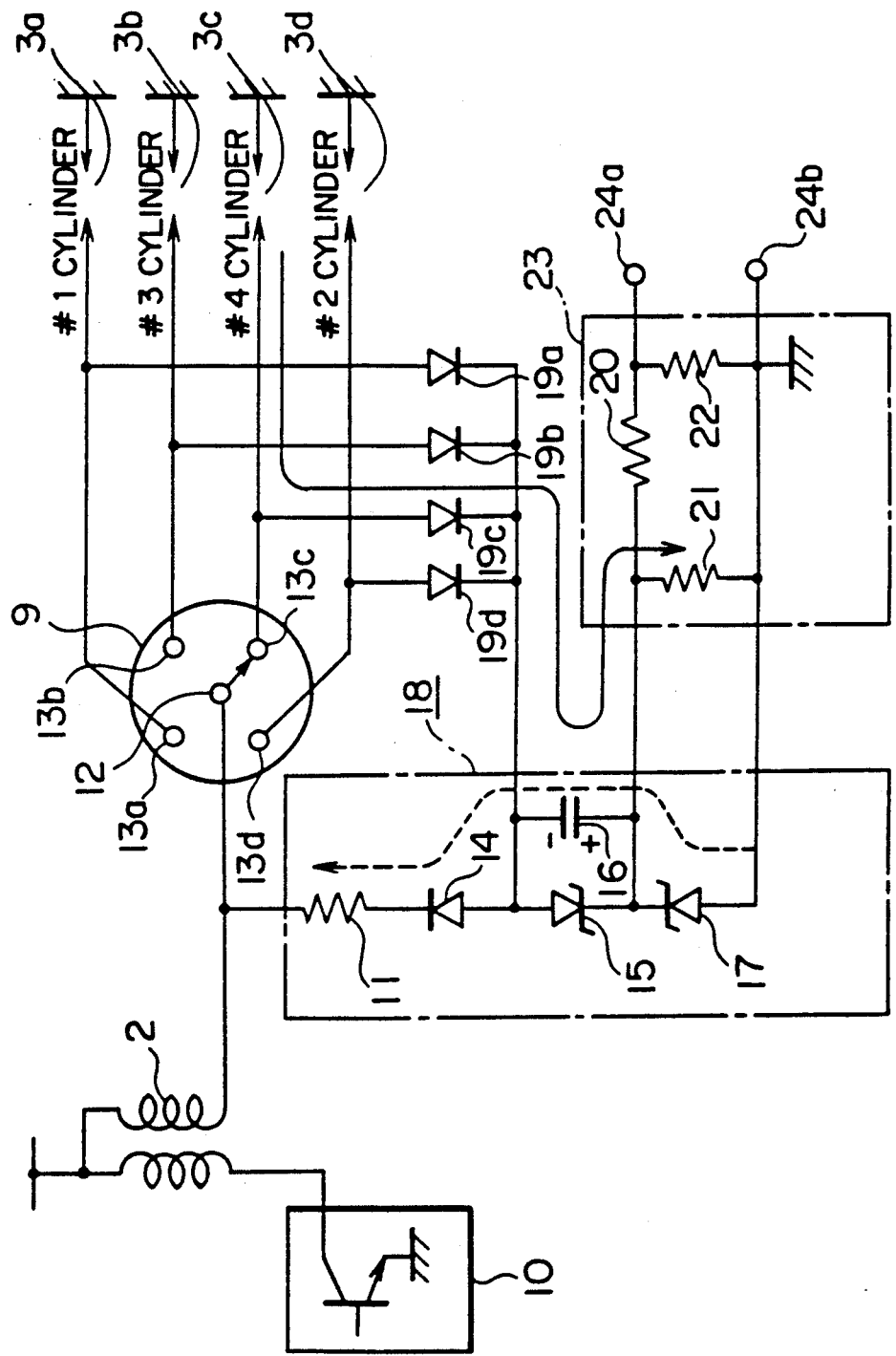
FIG. 3 is a circuit diagram showing the overall organization of an ionization current detector device according to this invention.
Figure 4:
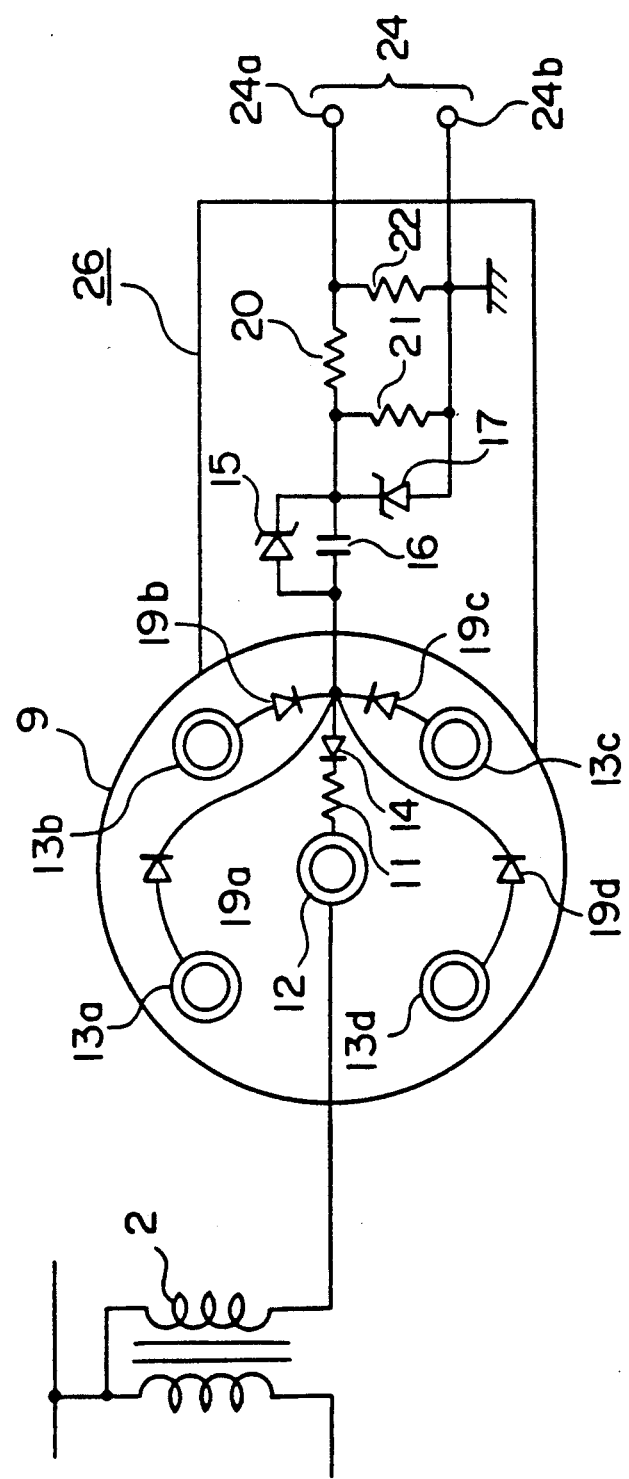
FIG. 4 is a schematic circuit diagram showing the mounting method of the ionization current detector device according to this invention.
Figure 5:
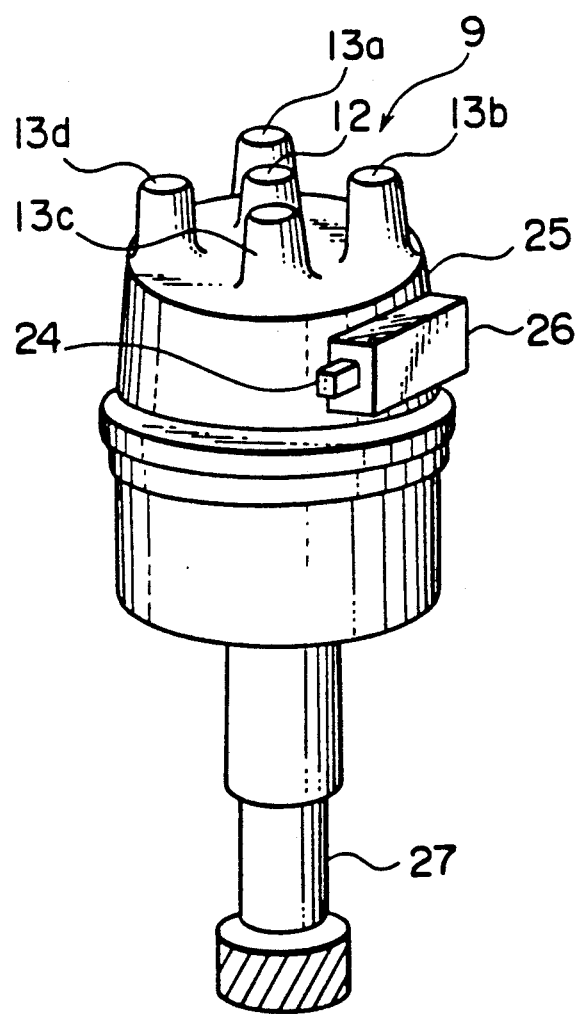
FIG. 5 is a partial perspective view of a distributor to which the ionization current detector unit is mounted according to this invention.

Referring now to FIGS. 3 through 5 of the drawings, a preferred embodiment of this invention is described.

Referring to FIG. 3 of the drawings, let us first describe the overall circuit organization of an ionization current detector according to an embodiment of this invention for the detection of combustion states within respective cylinders of a four-cylinder engine. The upper half of FIG. 3 shows the circuit organization of the ignition system of the engine which comprises: an ignition coil 2; a distributor 9 whose central terminal 12 is coupled to the output terminal of the secondary side the ignition coil 2; and spark plugs 3a, 3b, 3c and 3d of the cylinders Nos. 1, 3, 4, and 2, having respective spark gaps 3a through 3d electrically coupled across the ground and the peripheral terminals 13a through 13d of the distributor 9. An ignition device 10 consisting of a power transistor, etc., is coupled to the primary side winding of the ignition coil 2 so as to turn on and off the primary current supplied to the ignition coil 2.

On the other hand, the organization of the ionization current detector device according to this invention is shown in the lower half of FIG. 3. The ionization current detector device consists of three circuit portions: a high voltage generation circuit means 18, including a capacitor 16, coupled across the ground and the output terminal of the secondary side of the ignition coil 2; rectifier diodes 19a through 19d, each coupled across a peripheral terminal of the distributor 9 and the non-grounded side of the capacitor 16; and an ionization current detector circuit means 23 coupled across the ground and the grounded side terminal of the capacitor 16. Let us now describe the circuit organization in detail.

The four diodes 19a through 19d, whose anodes are electrically coupled to one of the two terminals of the gaps 3a through 3d of the spark plugs of the respective cylinders Nos. 1 through 4, are coupled at the cathodes thereof to an anode of a Zener diode 15 and a terminal (negatively charged terminal) of capacitor 16. The cathode of the Zener diode 15 and the other terminal (positively charged terminal) of the capacitor 16 are coupled to ionization current detector circuit 23, which consists of: a resistor 21 coupled across the grounded terminal 24b of the ionization current detector circuit means 23 and the positively charged terminal of the capacitor 16; and a voltage divider consisting of the series connected resistors 20 and 22 coupled in parallel with the resistor 21. The non-grounded detector output terminal 24a is coupled to the intermediate point between the resistors 20 and 22. The high voltage generation circuit means 18 comprises, in addition to the capacitor 16 and the Zener diode 15, a resistor 11, a diode 14, and another Zener diode 17. Thus, a series circuit consisting of resistor 11 and diode 14 is coupled across the central terminal of the distributor 9 and the anode of the Zener diode 15, the anode of the diode 14 being coupled to the anode of the Zener diode 15. In addition, the other Zener diode 17 is coupled across the positive terminal of the capacitor 16 and the ground, the cathodes of the Zener diodes 15 and 17 being coupled to each other. The circuit 18 consisting of the resistor 11, diode 14, Zener diodes 15 and 17, and the capacitor 16 constitutes a high voltage generation circuit means.

The method of operation of the ionization current detector device of FIG. 3 is as follows.

When the primary current supplied to the ignition coil 2 is turned off by the ignition device 10, a high voltage of negative polarity is developed at the output terminal of the secondary side of the ignition coil 2, so that a spark is hit across the gap of the spark plug coupled to the ignition coil 2 via the distributor 9 (the plug 3c in the state shown in FIG. 3), to ignite and combust the air-fuel mixture in the associated cylinder (cylinder No. 4 in the state shown in FIG. 3). At the same time, as shown by a dotted arrow in FIG. 3, a charging current flows from the ground to the output terminal of the secondary side of the ignition coil 2, via the series circuit of the Zener diode 17, the capacitor 16, the diode 14 and the resistor 14, in the above order, thereby charging the capacitor 16 in the polarity shown in FIG. 3. In this manner, the capacitor 16 is charged every time a high ignition voltage is induced across the secondary winding of the ignition coil 2, and a high voltage is thus developed and maintained across the two terminals of the capacitor 16. This high voltage developed across the capacitor 16 is limited to a predetermined constant magnitude by means of the Zener diode 15, which is coupled across the capacitor 16 in an opposite polarity thereto.

The substantially constant high voltage thus developed across the capacitor 16 is constantly applied across the gaps 3a through 3d of the spark plugs, via the respective rectifier diodes 19a through 19d and the resistor 21 of the ionization current detector circuit means. When the combustion within the cylinders of the engine is normal, the concentration of the ions within the respective cylinders periodically increases and decreases following a regular variation curve. Thus, an ionization current flows in the series circuit formed by: the gap of one of the spark plugs 3a through 3d of the cylinder in the combustion stroke; one of the diodes 19a through 19d which is coupled to the plug in the combusted cylinder; the capacitor 16; and the resistor 21, wherein a voltage corresponding to the ionization current is developed across the resistor 22 of the voltage divider circuit consisting of the resistors 20 and 22. For example, when the combustion within the cylinder No. 4 is normal and the concentration of ions within the cylinder No. 4 increases, an ionization current flows as indicated in the solid arrow in FIG. 3, whose magnitude is detected by means of the voltage developed across the detector output terminals 24a and 24b. On the other hand, if the combustion state is abnormal within the cylinder No. 4 and the concentration of the ions therewithin does not increase, then no appreciable current flows across the gap 3c of the plug of the cylinder No. 4, and hence no appreciable voltage is developed across the terminals 24a and 24b. Thus, the combustion states within respective cylinders of the engine can be determined from the detector output voltage generated across the terminals 24a and 24b.

Referring next to FIGS. 4 and 5 of the drawings, let us describe a method of mounting the ionization current detector device of FIG. 3.

FIG. 4 shows the circuit of the ionization current detector as mounted to the distributor 9. As shown in FIG. 5, the whole ionization current detector device is mounted as a single detector unit 26 to the distributor cap 25. In FIG. 5, reference numeral 24 represents an output connector of the detector (providing the terminals 24a and 24b of FIGS. 3 and 4), and reference numeral 27 represents the rotating shaft of the distributor 9. The high voltage generation means 18 is small-sized and hence the detector of FIG. 3 can be mounted to the distributor cap 25 as shown in FIGS. 4 and 5. According to the mounting method shown in FIGS. 4 and 5, the need for a long high voltage cord is eliminated and hence the generation of electromagnetic noises can effectively suppressed.

While description has been made of the particular embodiment of this invention, it will be understood that many modifications may be made without departing from the spirit thereof; the appended claims are contemplated to cover any such modifications as fall within the true spirit and scope of this invention.

What is claimed is:

1. An ionization current detector device for detecting combustion states within cylinders of a multicylinder internal combustion engine having an ignition system including an ignition coil, a distributor, and spark plugs for respective cylinders having gaps electrically coupled across respective peripheral terminals of the distributor and the ground, said ionization current detector device comprising:

high voltage circuit means, coupled across ground and an output terminal of a secondary side of the ignition coil, for providing a high voltage for an ionization current by means of a high voltage produced across the ground and the output terminal of the secondary side of the ignition coil, said high voltage circuit means including a capacitor means for maintaining thereacross the high voltage produced across the ground and the output terminal of the secondary side of the ignition coil;

ionization current detector circuit means, coupled across a grounded side terminal of the capacitor means and the ground, for generating a detector output voltage proportional to an ionization current flowing therethrough; and a plurality of rectifier diodes, each coupled across a peripheral terminals of the distributor and a terminal of the capacitor means opposite to the grounded side terminal thereof, each diode having a forward conducting direction to allow an ionization current to flow through a series circuit comprising: a gap of the spark plug, the diode, the capacitor means, and the ionization current detector circuit means, the ionization current being produced by the voltage maintained across the capacitor means.

2. An ionization current detector device as claimed in claim 1, wherein said high voltage circuit means further comprises:

a first rectifier diode coupled across the ground and the grounded side terminal of the capacitor means; and a second rectifier diode coupled across the terminal of the capacitor means opposite to the grounded side terminal thereof, and the output terminal of the secondary side of the ignition coil;

wherein said first and second rectifier diodes have a forward conducting direction to allow a charge current charging the capacitor means to flow across the ground and the output terminal of the secondary side of the ignition coil.

3. An ionization current detector device as claimed in claim 2, wherein said high voltage circuit means further comprises a Zener diode coupled in a parallel circuit relationship with the capacitor means in a polarity opposite to a polarity of the capacitor means so as to limit under a predetermined level the voltage maintained across the capacitor means.

4. An ionization current detector device as claimed in claim 2, wherein said high voltage circuit means further comprises a resistor coupled across the non-grounded side terminal of the capacitor means and the output terminal of the secondary side of the ignition coil.

5. An ionization current detector device as calimed in claim 2, wherein said first rectifier diode consists of a Zener diode.

6. An ionization current detector device as claimed in claim 1, wherein said ionization current detector circuit means comprises:
   a first resistor coupled across the grounded side terminal of the capacitor and the ground; and
   a voltage divider coupled across said first resistor, wherein the ionization current detector means develops a voltage proportional to the ionization current across an intermediate point of the voltage divider and the ground.

7. An ionization current detector device as claimed in claim 1, wherein said high voltage circuit means is physically mounted on the distributor.

8. An ionization current detector device as claimed in claim 1, wherein the whole ionization current detector device is comprised in a single unit physically mounted on the distributor.

9. An ionization current detector device as claimed in claim 8, wherein said single unit is mounted on a cap of the distributor.

10. An ionization current detector device for detecting combustion states within cylinders of a multicylinder internal combustion engine having an ignition system including an ignition coil, a distributor, and spark plugs for respective cylinders having gaps electrically coupled across respective peripheral terminals of the distributor and the ground, said ionization current detector device comprising:
   high voltage circuit means, coupled across ground and an output terminal of a secondary side of the ignition coil, for providing a high voltage for an ionization current by means of a high voltage produced across the ground and the output terminal of the secondary side of the ignition coil, said high voltage circuit means including a capacitor means for maintaining thereacross the high voltage produced across the ground and the output terminal of the secondary side of the ignition coil;
   ionization current detector circuit means, coupled in series with the capacitor means of the high voltage circuit means, for generating a detector output voltage proportional to an ionization current flowing therethrough; and
   rectifier circuit means, coupled in series circuit relationship with the capacitor means and the ionization current detector circuit means, for suppressing a direction of current opposite to a direction of an ionization current which is produced by the high voltage maintained across the capacitor means and which flows through a series circuit comprising a gap, said rectifier circuit means and said ionization current detector circuit means but excluding the secondary side of the ignition coil.

* * * * *